United States Patent [19]
Varan

[11] Patent Number: 6,142,562
[45] Date of Patent: Nov. 7, 2000

[54] BICYCLE SEAT

[76] Inventor: Cyrus Varan, 236 Vipond Road, Whongaparaca, Hibiscus Coast, New Zealand

[21] Appl. No.: 09/234,473

[22] Filed: Jan. 21, 1999

[51] Int. Cl.[7] .................................................... B62J 1/00
[52] U.S. Cl. ...................... 297/201; 297/195.1; 297/312
[58] Field of Search .............................. 297/195.1, 201, 297/215.13, 312

[56] References Cited

U.S. PATENT DOCUMENTS

| | | | |
|---|---|---|---|
| 608,089 | 1/1898 | Wellmann | 297/312 |
| 619,768 | 2/1899 | Lewis, Jr. | 297/312 |
| 689,493 | 12/1901 | Jarvis | 297/312 |
| 749,865 | 1/1904 | Jarvis | 297/312 |
| 4,089,559 | 5/1978 | Prange et al. | 297/201 |
| 4,541,668 | 9/1985 | Rouw | 297/201 |
| 5,167,435 | 12/1992 | Aldi | 297/201 |
| 5,387,025 | 2/1995 | Denisar | 297/209 |

*Primary Examiner*—Peter R. Brown

[57] ABSTRACT

A bicycle seat is provided including a pair of uppwardly divergent, opposite side support arms having lower ends pivotally mounted from a bicycle frame appreciably below the usual bicycle seat mounting structure of the bicycle frame and upper ends swingable toward and away from each other. The upper ends of the support arms include generally horizontal weight support members having longitudinal mid-portions pivotally supported from the arm upper ends for oscillation about generally horizontal transverse axes and the arms, including their pivotal mounting, are mounted from the bicycle frame for limited oscillation about an upstanding axis, angular displacement about the upstanding axis, in both directions from a center position thereof, being progressively yieldingly resisted.

13 Claims, 4 Drawing Sheets

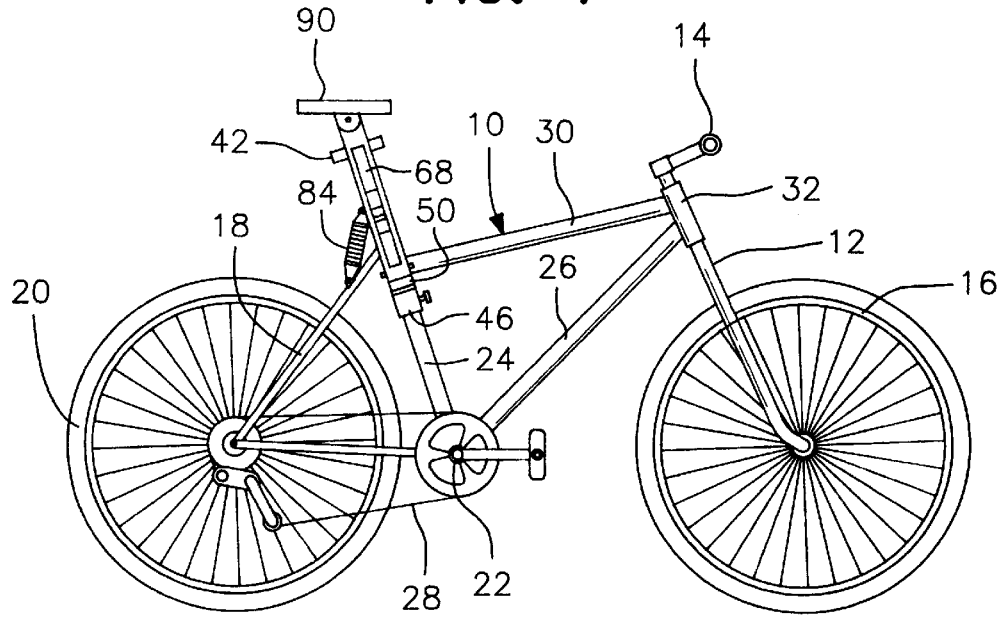
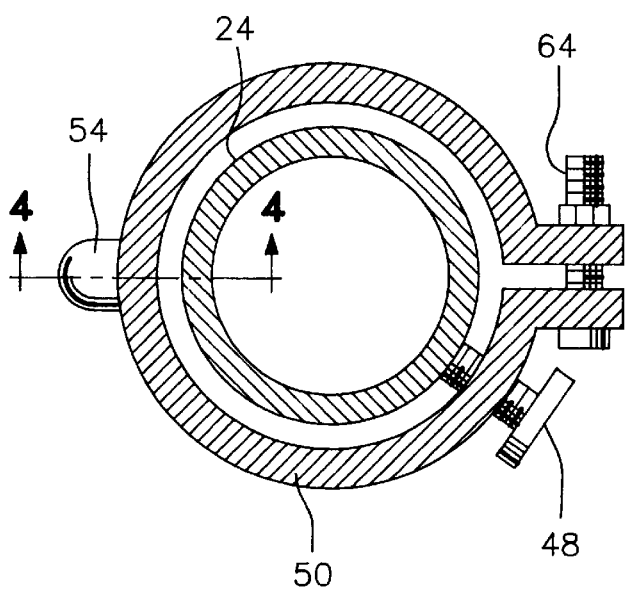
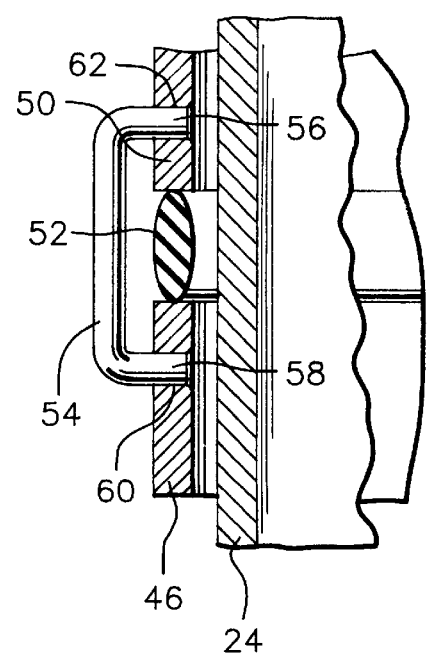

BICYCLE SEAT

CROSS REFERENCE TO RELATED APPLICATIONS

Not Applicable

STATEMENT REGARDING FEDERAL SPONSORED RESEARCH OR DEVELOPMENT

Not Applicable

BACKGROUND OF THE INVENTION

1. Field of the Invention

This invention relates to a bicycle seat designed to eliminate physical stress in the crouch area of riders' using the seat.

Conventional seats that are presently used on many bicycles are of a one-piece design and include a wider portion upon which the rider's buttocks rest and a narrow "horn" portion positioned on a forward portion of the seat, the "horn" portion extending forward between the upper thighs of a rider immediately beneath the rider's crouch area.

When riding a bicycle in a seated position and leaning forward on a conventional bicycle seat such as that described immediately above, a considerable portion of the weight of the rider is supported on the horn portion of the seat and thus the rider's crouch area is subject to an upward force thereon amounting to a considerable portion of the weight of the rider.

This considerable upward pressure can have adverse physical effects on the rider including a sore or numb posterior, chafed upper inner thigh areas, and increasing incidents prostatitis among male cyclists. Further, all of these problems resulting from the use of a one-piece bicycle seat including a forwardly projecting "horn" are magnified in the case of heavier bicycle riders. Accordingly, a need exists for a bicycle seat which may be more comfortably used by bicycle riders, and in particular heavier bicycle riders.

2. Description of Related Art

Various different bicycle saddles or seats heretofore have been devised to provide a more comfortable ride for a bicycle rider.

U.S. Pat. No. 608,089 to L. P. Wellman discloses a dual top or cup seat, which may be adjusted in width, and which includes tops or cups which are mounted for limited vertical movement and are spring biased upwardly.

U.S. Pat. No. 619,768 to R. Lewis, Jr. discloses a dual seat construction wherein the two tops of the seat are spring mounted and may be canted in substantially any direction about vertical axis.

U.S. Pat. No. 689,493 to J. Jarvis discloses a dual top cycle saddle or seat specifically designed for carrying rifles, fishing-rods, hockey sticks or polo seats and like articles on bicycles. In addition, the Jarvis dual top saddle includes a pair opposite side spring mounted seat tops or pads.

U.S. Pat. No. 749,865 to J. Jarvis discloses a dual top seat which is similar in many respects to the dual top seat described immediately above.

U.S. Pat. No. 4,089,559, to Bernard H. Prang et al discloses a dual top seat including inversely oscillatable pads which are pivotally mounted for oscillation about horizontal transverse axes.

U.S. Pat. No. 4,541,668 to William Rouw discloses a dual top bicycle seat including opposite side pads which are oscillatable about center horizontal, longitudinal axis.

U.S. Pat. No. 5,167,435 to A. Joseph Aldi discloses a bicycle seat including a spring mounted center section having opposite side wing portions pivotally supported therefrom and which pivot from downward and outward inclined positions to horizontal or slightly upwardly inclined positions in response to increased downward pressure on the center seat section.

U.S. Pat. No. 5,387,025 to Richard A. Denisar discloses a dual top bicycle seat which is similar to the Prange et al seat discussed above, but which is further mounted for oscillation, as a whole, about an upstanding axis.

SUMMARY OF THE INVENTION

The bicycle seat of the instant invention is disclosed in two forms. Each disclosed form of bicycle seat includes a pair upwardly divergent, opposite side arms having upper and lower ends. The lower arm ends are pivotally mounted from a rear frame portion of the bicycle for swinging movement of the upper arm ends toward and away from each other on opposite lateral sides of the bicycle frame. Each of the arm upper ends is provided with a front-to-rear extending, generally horizontal rider weight support structure supported therefrom and each rider weight support structure is oscillatably supported from the corresponding upper arm end for limited angular displacement about a generally horizontal transverse axis.

The rider weight support structures each are adapted to support the upper rear thigh areas (when the rider's thighs are generally horizontal) of a rider having a portion or all of his or her weight supported from the rider weight support structures. By oscillatably supporting the rider weight support structures from the upper ends of the corresponding arms, the rider weight support structures may conform to the generally oscillating movement of the upper thigh portions of a rider as his or her legs are used to drive the pedals of the bicycle.

In a first disclosed form of the invention the rider weight support structures comprise channel members which may or may not be padded and which cradle the upper thigh portions of a rider seated upon the seat. In the second disclosed form of the invention the rider weight support structures comprise front-to-rear extending members upon which opposite ends of an elongated strap member are secured. If desired, the strap member may be slightly elastic.

The main object of this invention is to provide a bicycle seat which may be used by bicycle riders in a manner to provide more comfort, especially to heavier riders, and which will substantially eliminate the incidents of prostatis among male cyclists and further eliminate painful pressure points on the prostate and pelvis.

A further object of this invention is to provide a bicycle seat which will support the weight of a rider thereon, primarily, from a lower portion of the bicycle frame than is accomplished by a conventional bicycle seat.

Another object of this invention is to provide a bicycle seat in accordance with the preceding objects and which may be adapted to existing bicycles.

A final object of this invention to be specifically enumerated herein is to provide a bicycle seat in accordance with the preceding objects, and which will conform to conventional forms of manufacture, be of simple construction, and easy to use so as to provide a device that will be economically feasible, long-lasting, and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a right side elevational view of a typical wheeled bicycle frame to which a first form of the bicycle seat of the instant invention has been mounted;

FIG. 3 is enlarged fragmentary horizontal sectional view taken substantially upon the plane indicated by the section line 3—3 of FIG. 2;

FIG. 4 is a vertical sectional view taken substantially upon the plane indicated by the section line 4—4 of FIG. 3;

DETAILED DESCRIPTION OF THE INVENTION

Figure 2:
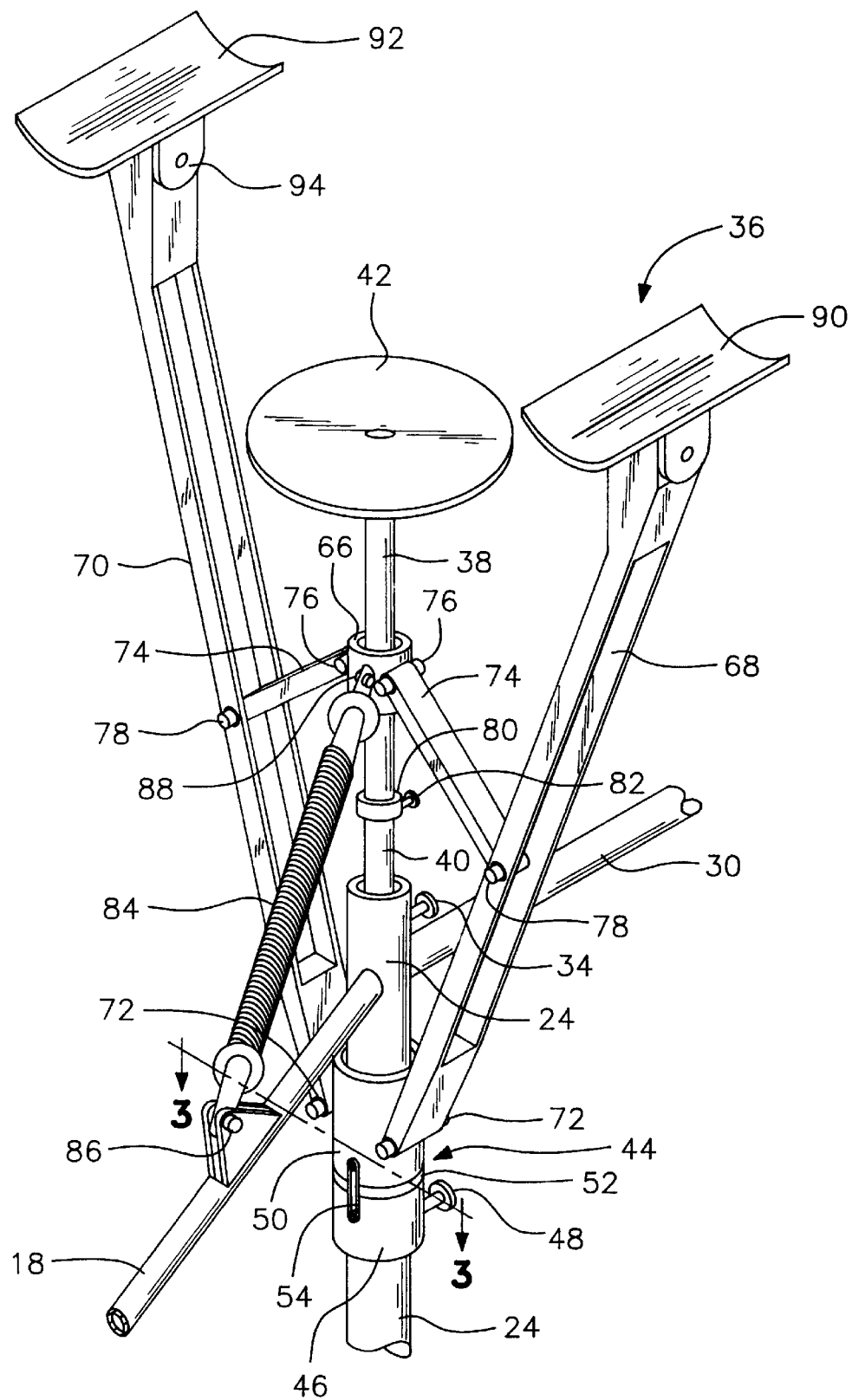
FIG. 2 is an enlarged perspective view of the first form of bicycle seat illustrating its mounting upon adjacent frame portions of the bicycle.

Referring now more specifically to the drawings and to FIG. 1 in particular, the numeral 10 generally designates a convention form of bicycle frame including a front fork assembly 12, a handle bar 14, a front wheel 16 journalled from the front fork assembly 12, rear bifurcated frame portion 18 and a rear wheel 20 journalled from the rear frame portion 18. In addition, a pedal crank assembly 22 is journalled from the intersection of the interconnected rear and lower frame member 24 and 26 and is drivingly connected to the rear wheel 20 by a drive chain 28. The frame 10 includes an upper frame member 30 extending between the upper end of the rear frame member 24 and a journal sleeve which rotably supports the front fork assembly 12 and to which the forward ends of the upper and lower frame members 30 and 26 are secured.

The upper end of the rear frame member 24 includes a set screw 34 which usually tightens the depending adjustable shank of a conventional bicycle seat (not shown) within the upper end of the rear frame member 24.

However, the bicycle seat of the instant invention is referred to in general by the reference numeral 36 (see FIG. 2) and includes a upstanding guide shank 38 whose lower end 40 is adjustably secured within the upper end of the rear frame member 24 through the utilization of the set screw 34. The upper end of the guide shank 38 includes a disc-shaped member 42 mounted thereon as a safety measure.

A mount structure referred to in general by the reference numeral 44 is mounted on the rear frame member 24 below the adjacent portions of the upper frame member 30 and the rear frame portion 18 and includes a lower adjustable fixed sleeve 46 held in vertically adjusted position on the rear frame member 24 by a set screw 48. A sleeve 50 is disposed and oscillatable on the frame member 24 spaced slightly above the fixed sleeve 46 and a resilient compression ring 52 comprising yieldable resistance means, is interposed between the sleeves 46. Further, 50 and a U-shaped connecting link 54 has its free ends 56 and 58 anchored and rotably received in radial bores 60 and 62 formed in the sleeves 46 and 50. The link 54 allows limited oscillation of the sleeve 50 relative to the sleeve 46 and the compression ring 52 increasingly resists oscillation of the sleeve 50 in opposite directions from a center position thereof relative to the sleeve 46.

The sleeves 46 and 50 are each of the split sleeve type and may therefore be opened and passed about the rear frame member 24 for mounting thereon, after which each sleeve 46 and 50 may be clamped closed and secured in a closed position by an associated fastener 64, only the sleeve 46 including the set screw 48.

A guide sleeve 66 is slidingly disposed on the upper end of the guide shank 38 below the member 42 and a pair of upwardly divergent arms 68 and 70 have their lower ends pivotally supported from the oscillatable sleeve 50 as at 72. A pair of elongated links 74 have one pair of ends pivotally anchored to the guide sleeve 66 as at 76 and a second pair of ends pivotally attached to longitudinal midportions of arms 68 and 70 as at 78. Further, a stop collar 80 equipped with a set screw 82 is slidingly mounted upon the guide shank 38 below the guide sleeve 66 and is held in adjusted position thereon by the set screw 82.

Further, an elongated compression spring equipped airplane type shock absorber 84 is mounted in inclined position on the rear end of the frame 10 and has its lower end pivotally anchored as at 86 to the rear frame portion 18, its upper end being pivotally anchored to the guide sleeve 66 as at 88.

It also will be noted from FIG. 2 of the drawings that the upper ends of the support arms 68 and 70 have elongated generally horizontally disposed rider weight support structures in the form of trough members 90 and 92 pivotally supported therefrom as at 94.

The trough members 90 and 92 may be uncovered or they may be provided with a padded covering (not shown) if desired.

In operation, a rider mounts the bicycle with the upper portion of his or her thighs resting in the trough members 90 and 92. As weight is applied to the trough members 90 and 92 they tend to spread apart until an equilibrium is reached by downward movement of the guide sleeve 66 and compression of the compression spring equipped shock absorber 84. As the rider presses downward with his or her legs in an alternate manner on the pedal crank assembly 22, the trough members 90 and 92 are oscillated back and forth so as to change the inclinations thereof according to the change in the inclination of the upper thighs of the rider. In addition, as the rider pushes downwardly on the pedal crank assembly 22 with one leg, the oscillating sleeve 50 turns slightly relative to the fixed sleeve 46 so as to slightly forwardly shift the trough member supporting the thigh of the rider corresponding to the leg making the downward movement. Of course, as the opposite leg of the rider is downwardly depressed during the next 180 degree rotation of the pedal crank assembly 22, the oscillating sleeve 50 rotates back in the opposite direction, oscillation of the oscillating sleeve 50 being limited by the link 54 and compression of the resilient compression ring 52.

As the bicycle rides over the bumps, the force of the bumps is somewhat absorbed by downward and outward movement of the trough members 90 and 92 as resisted by the elongated spring equipped shock absorber 84.

Figure 5:
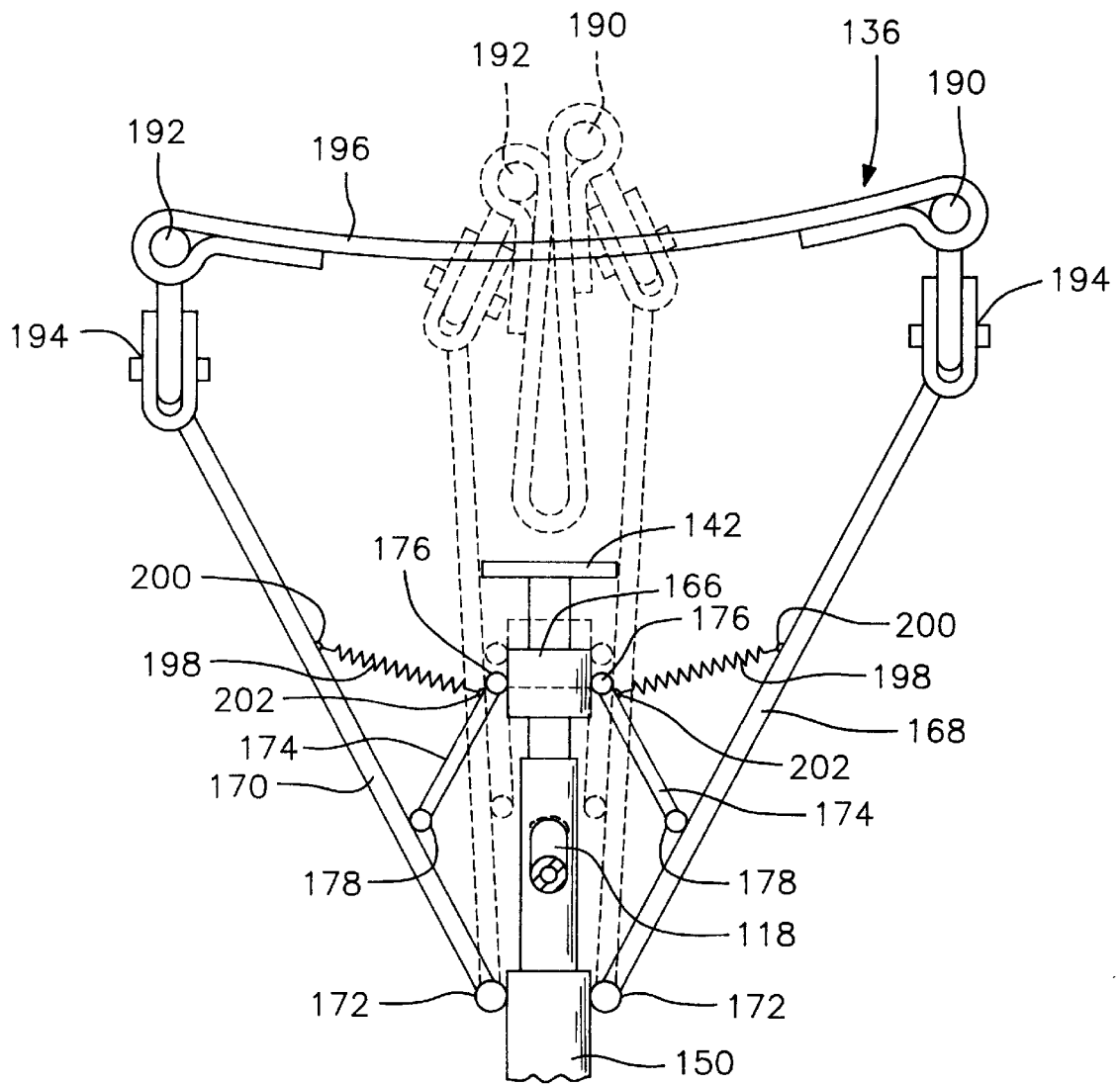
FIG. 5 is a rear elevational view of a second form of bicycle seat of the instant invention.
Figure 6:
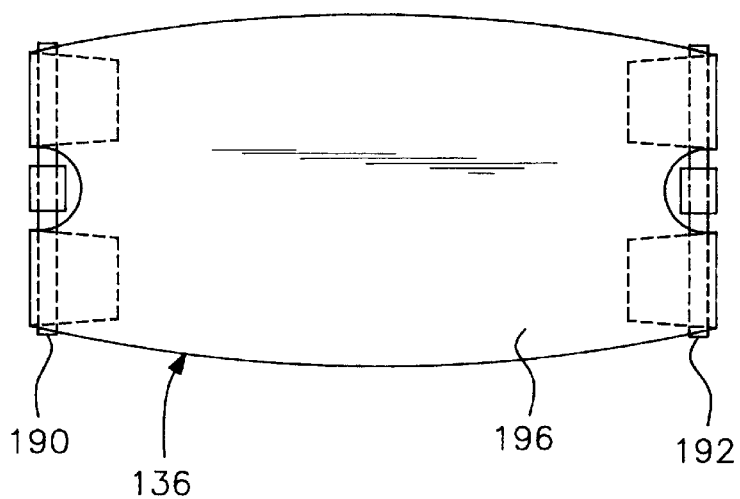
FIG. 6 is a top plan view of the second form of bicycle seat.
Figure 7:
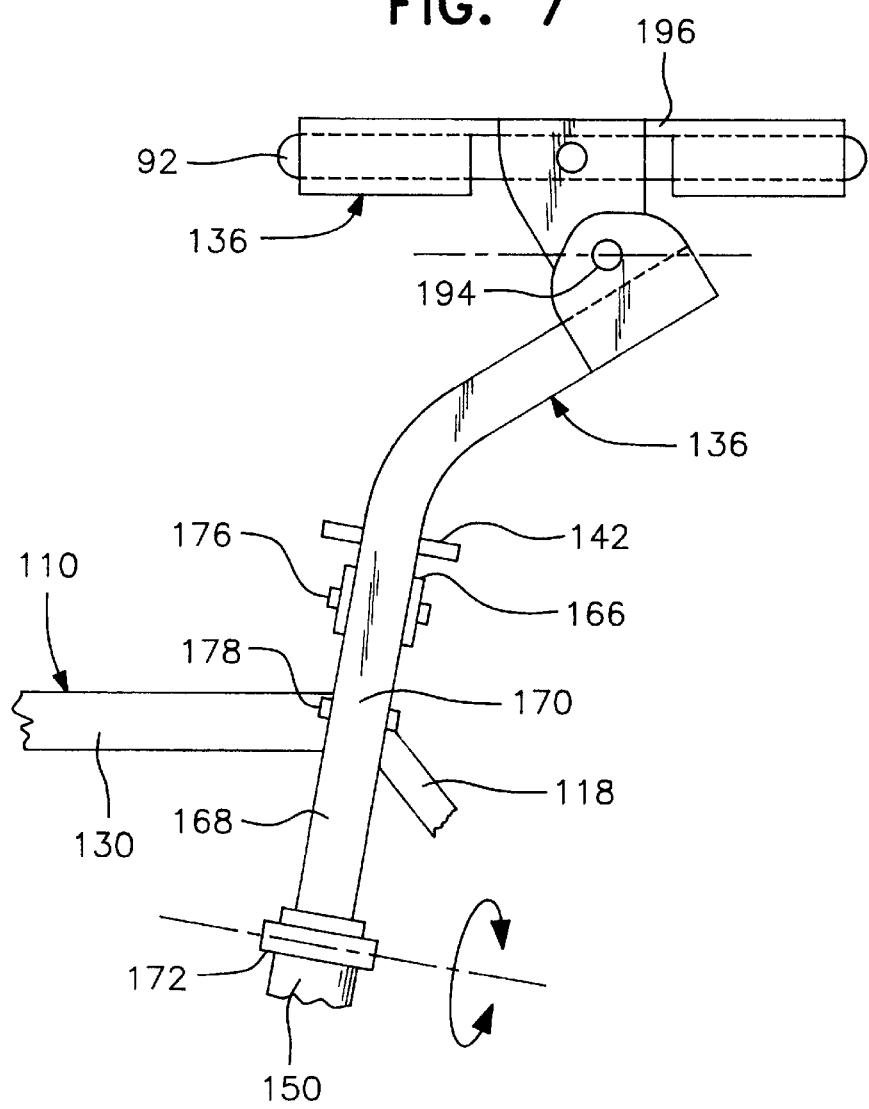
FIG. 7 is a side elevational view of the second form of bicycle seat and adjacent bicycle frame portions.

With attention now invited to FIGS. 5–7 of the drawings, a second form of bicycle seat is referred to in general by the reference numeral 136. In addition, those portions of the bicycle from which the seat 136 is supported, and which correspond to the bicycle illustrated in FIGS. 1–4, are generally designated by corresponding reference numerals in the 100 series.

The oscillatable sleeve 150 corresponding to the sleeve 50 has the lower ends of a pair of support arms 168 and 170 corresponding to the support arms 68 and 70 pivotally supported therefrom as at 172. The upper ends of the support arms 168 and 170 pivotally support longitudinal midportions of a pair of front to rear extending bar-like rods or weight support structures 190 and 192 therefrom as at 194. An elongated flexible strap member 196 includes opposite end portions anchored relative to the weight supporting structures 190 and 192. A pair of inclined links have their lower ends pivotally anchored to longitudinal midportions of the support arms 168 and 170 as at 178 while their upper ends are pivotally anchored to the guide sleeve 166 as at 176. Further, a pair of expansion springs 198 have a first set of corresponding ends anchored to longitudinal midportions of the support arms 168 and 170 as at 200 and the other set or corresponding ends anchored to the upper ends of the links 174 as at 202.

The disc shaped member 142 is smaller in diameter than the disc shaped member 42 to allow the support arms 168 and 170 to swing upwardly into substantially parallel positions in the manner illustrated in phantom lines in FIG. 5. In addition, it will be noted that the support arm 168 is slightly longer than the support arm 170 and, therefore, when the arms 168 and 170 are swung toward each other, the weight supporting structure 190 is slightly elevated above the weight supporting structure 192. In this manner, a person mounting the bicycle may have both the weight supporting structures 190 and 192 between his or legs upon initial mounting the bicycle. Then, as the rider begins to ride the bicycle the weight supporting structures 190 and 192 may be swung outward to the approximate positions thereof illustrated in FIG. 5 before the rider places his or her weight upon the strap member 196 and the weight supporting structures 190 and 192. The bicycle seat 136 does not include the equivalent of the combined spring and shock absorber 84 included bicycle seat 36. Rather, the bicycle seat 136 relies upon the expansion springs 198 in conjunction with elasticity of the strap member 196 in order to provide shock absorbing capacity for the rider. In that form of the invention illustrated in FIGS. 1–4, the pivot connections 72, the links 74 and the pivotal connections 76 and 78 together comprise mounting means mounting the lower ends of the opposite side arms 68 and 70 from the mount structure or sleeve 50 for limited swinging of the upper ends of the side arms 68 and 70 toward and away from each other on opposite lateral sides of the frame 10. Further the sleeve 50 (oscillatable on the frame member 24), the sleeve 46 and the link 54 comprise pivot structure mounting the mount structure (sleeve 50) from the frame member 24 for limited oscillation relative thereto. Also, that form of the invention illustrated in FIGS. 5–7 includes similar mounting means for the arms 168 and 170 including the pivotal connections 172, links 174 and pivotal connections 176 and 178.

Finally, the swinging of the upper ends of arms 68, 70 and 168, 170 away from each other serves to laterally broaden the weight supporting areas of the seat structure for a heavier person and the limited oscillation of the seat structures enables the rider weight supporting structures to oscillate and thus to conform to the generally oscillating movement of the upper thigh and hip portions of a rider whose legs are used to drive the pedals.

The foregoing is considered as illustrative only of the principles of the invention. Further, since numerous modifications and changes readily will occur to those skilled in the art, it is not desired to limit the invention to the exact construction and operation shown and described, and, accordingly, all suitable modifications and equivalents may be resorted to, falling within the scope of the invention.

What is claimed as new is as follows:

1. In combination, a bicycle frame having front and rear portions and an upright frame member whose lower end is disposed closely forward of a rear wheel journalled from said rear portion of said frame, a seat structure including mount structure on an upper portion of said upright frame member, a pair of upwardly divergent opposite side arms having upper and lower ends, mounting means mounting said lower ends from said mount structure for limited swinging of said upper ends toward and away from each other on opposite lateral sides of said frame, said upper ends each include rider weight support structure supported therefrom, said mounting means including pivot structure mounting said mount structure from said upright frame member for limited oscillation about said upright frame member.

2. The combination claim 1 wherein said rider weight support structures each comprise a generally trough-shaped structure configured to cradle the rear upper thigh areas of a rider.

3. The combination of claim 1 including support means supporting each of said rider weight support structures from the upper end of the corresponding arm for limited oscillation about a generally horizontal axis extending transversely of said frame.

4. The combination of claim 1 including spring means operably connected between said arms and said frame yieldingly biasing said arm upper ends toward each other from their limit positions of maximum relative spacing.

5. The combination of claim 1 including at least one flexible rider weight supporting panel extending between said rider weight support structures.

6. The combination of claim 5 wherein said weight supporting structures, when said upper ends of said support arms are swung toward each other, are disposed in close juxtaposition with one of said weight support structures elevated above the other weight support structure to thereby receive the weight support structures in a narrow zone extending longitudinally of said frame.

7. The combination of claim 1 including a guide member mounted from said frame for guided shifting along and limited oscillation about a path at least generally coinciding with the longitudinal extend of said upright frame member, said guide member being spaced appreciably above said mount structure, a pair of elongated connecting links having first corresponding ends pivotally anchored to longitudinal midportions of said arms and second corresponding ends pivotally anchored to said guide member.

8. The combination 7 including spring means operably connected between said arms and said frame yieldingly biasing said arm upper ends toward each other from their limit positions of maximum relative spacing, said links being upwardly convergent, said spring means including at least one elongated, upstanding and compression spring equipped airplane-type shock absorber connected between said frame and guide member.

9. The combination of claim 7 including spring means operably connected between said arms and said frame yieldingly biasing said arm upper ends toward each other from their limit positions of maximum relative spacing, said spring means including expansion springs connected between said links and longitudinal midportions of said arms.

10. The combination of claim 9 including at least one flexible rider weight supporting panel extending between said rider weight support structures.

11. The combination of claim 1, including yieldable resistance means operably associated with said mount and frame member increasingly yieldingly resisting oscillation of said mount structure in opposite directions from a center position thereof.

12. In combination, a bicycle frame having front and rear portions and an upright frame member whose lower end is disposed closely forward of a rear wheel journalled from said rear portion of said frame, a seat structure including mount structure on an upper portion of said upright frame member, a pair of upwardly divergent opposite side arms having upper and lower ends, mounting means mounting said lower ends from said mount structure for limited swinging of said upper ends toward and away from each other on opposite lateral sides of said frame, said upper ends each include rider weight support structure supported therefrom, at least one flexible rider weight supporting panel extending between said rider weight support structures, said mounting structure being mounted from said upright frame member for limited oscillation about said upright frame member.

13. The combination of claim 12 including a guide member mounted from said frame for guided shifting along and limited oscillation about a path at least generally coinciding with the longitudinal extend of said upright frame member, said guide member being spaced appreciably above said mount structure, a pair of elongated connecting links having first corresponding ends pivotally anchored to longitudinal midportions of said arms and second corresponding ends pivotally anchored to said guide member.

* * * * *